(12) United States Patent
Cromer et al.

(10) Patent No.: US 8,606,545 B2
(45) Date of Patent: Dec. 10, 2013

(54) APPARATUS, SYSTEM, AND METHOD FOR MEMORY CONFIGURATION ANALYSIS

(75) Inventors: Daryl Cromer, Cary, NC (US); Donald R. Frame, Apex, NC (US); Michael Scott Mettler, Durham, NC (US); Kenneth Dean Timmons, Raleigh, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 642 days.

(21) Appl. No.: 12/410,300

(22) Filed: Mar. 24, 2009

(65) Prior Publication Data

US 2010/0250197 A1   Sep. 30, 2010

(51) Int. Cl.
| | | |
|---|---|---|
| *G06F 3/03* | (2006.01) | |
| *G06F 3/00* | (2006.01) | |
| *G06F 3/023* | (2006.01) | |
| *G06F 3/027* | (2006.01) | |

(52) U.S. Cl.
USPC ............ 702/186; 702/185; 702/188; 702/189

(58) Field of Classification Search
USPC ........... 702/81, 109, 120, 127, 179, 185, 186, 702/188, 189; 700/97; 710/311; 711/118; 713/300
See application file for complete search history.

(56) References Cited

U.S. PATENT DOCUMENTS

| | | | | |
|---|---|---|---|---|
| 5,321,840 A | * | 6/1994 | Ahlin et al. ................... | 717/178 |
| 5,594,879 A | * | 1/1997 | Belmont ....................... | 710/311 |
| 7,072,728 B2 | * | 7/2006 | Montano et al. ............... | 700/97 |
| 7,127,622 B2 | * | 10/2006 | Schnepper ................... | 713/300 |
| 7,424,577 B2 | * | 9/2008 | Bali et al. ..................... | 711/118 |
| 7,506,297 B2 | * | 3/2009 | Mukherjee et al. ........... | 716/104 |

\* cited by examiner

*Primary Examiner* — Marc Armand
*Assistant Examiner* — Felix Suarez
(74) *Attorney, Agent, or Firm* — Kunzler Law Group (57) ABSTRACT

An apparatus, system, and method are disclosed for memory configuration analysis. A classification module 402 determines 1000 an overall performance of an array 706 of memory devices 500 in a computer memory 104, wherein overall performance has a substantially inverse relationship with a highest quantity of members of a subset of the array and a substantially direct relationship with an individual performance capability of the members. A counting module 404 takes a count 1110 of members of the array 706 whose individual performance capability varies 1108 in a selected direction from the overall performance of the array 706. A comparison module 406 takes a selected action such as issuing a memory configuration warning 1114 if the count crosses a predetermined threshold 1112 comprising a predetermined percentage for comparison with the count, as qualified by the individual performance capability, divided by an unqualified count of members of the array 706.

25 Claims, 8 Drawing Sheets

APPARATUS, SYSTEM, AND METHOD FOR
MEMORY CONFIGURATION ANALYSIS

FIELD

This invention relates to computer system configuration management and more particularly relates to memory configuration.

BACKGROUND

Description of the Related Art

A computer is a complex system, frequently requiring configuration management to optimize operational efficiency. Memory configuration is one important dimension of computer operation, both to expand capacity and to improve performance in a cost-efficient way.

The multiplicity of computer memory device types and characteristics, computer chip sets, and memory array topographies, all combine to present a formidable challenge in terms of memory configuration. A systematic approach to memory configuration analysis remains an elusive goal.

SUMMARY

From the foregoing discussion, it should be apparent that a long-felt unmet need exists for an apparatus, system, and method that automate memory configuration analysis in a systematic way. Beneficially, such an apparatus, system, and method would balance speed, capacity, and cost so as to assist in optimizing overall system efficiency.

The present invention has been developed in response to the present state of the art, and in particular, in response to the problems and needs in the art that have hitherto proven intractable under currently available system configuration management. Accordingly, the present invention has been developed to provide an apparatus, system, and method for memory configuration analysis that overcome many or all of the above-discussed shortcomings in the art.

One approach is to analyze the memory configuration in terms of a single criterion, such as capacity, speed, or cost. A memory that is too slow for system requirements would benefit from faster memory devices. A memory that is too small for system requirements would benefit from more or denser memory devices. A memory that is too expensive for system requirements would benefit from fewer or less costly memory devices.

Another approach to memory configuration analysis is to balance the potentially competing criteria of capacity, speed, and cost. It may be that increasing overall capacity in terms of memory device count would reduce the speed of the array as a whole, even if the individual memory devices were capable of higher speed. In such a case, depending upon system requirements, one might opt to replace the memory devices with lower-cost, slower memory devices to match the overall speed of the array. Another alternative might be to use fewer, denser memory devices, thereby eliminating the overall speed impact of the excessive memory device count. The decision to replace memory devices might also include a consideration of the cost of the new devices and whether the existing devices could be employed more cost-effectively elsewhere.

While the tradeoffs between competing configuration alternatives will of necessity be based upon the specific system requirements in any given case, a general figure of merit would be very helpful in determining whether such tradeoffs might need to be explored. The present invention provides such a figure of merit, comprising a percentage of the individual memory devices in the memory array that are not optimally chosen or configured with respect to the topography of the array as a whole. If that percentage crosses a predetermined threshold, then one or more selected actions may be appropriate.

The apparatus to analyze memory configuration is provided with a plurality of modules configured to functionally execute the necessary steps of determining an overall performance of an array of memory devices in a computer memory, taking a count of members of the array that have an individual performance capability that varies in a selected direction from the overall performance of the array, and taking a selected action if the count crosses a predetermined threshold. These modules in the described embodiments include a classification module, a counting module, and a comparison module.

The apparatus, in one embodiment, is configured to compare the count, as qualified by the individual performance capability, divided by an unqualified count of members of the array, wherein the predetermined threshold comprises a predetermined percentage. The apparatus is further configured, in one embodiment, to issue a memory configuration warning as the selected action to be taken.

In a further embodiment, the apparatus may be configured to determine the overall performance based upon a substantially inverse relationship with a highest quantity of members of a subset of the array and a substantially direct relationship with the individual performance capability of the members. Performance may be determined on the basis of one or more of frequency, bandwidth, access time, and latency. As a useful abstraction to suppress the interrelated complexity of these various performance criteria, a "performance class" may be defined as being representative of those configurations of the array and those individual performance capabilities of the memory devices that would support comparable overall performance.

A system of the present invention is also presented to analyze memory configuration. The system may be embodied by a computer having one or more processors and having a computer memory comprising an array of memory devices, the foregoing apparatus, and a control module that activates the classification module, the counting module, and the comparison module to analyze the configuration of the array. In particular, the system, in one embodiment, may include other memory devices in the computer memory that are not comprised in the array.

The system may further include subsets of the array which are associated with each of the one or more processors. The individual performance capability of the memory device may be determined on the basis of one or more of rank, capacity, speed, type, and depth. In a further embodiment, the memory device may comprise a dual in-line memory module ("DIMM") and the subset may comprise a channel.

A method of the present invention is also presented for analyzing memory configuration. The method in the disclosed embodiments substantially includes the steps necessary to carry out the functions presented above with respect to the operation of the described apparatus and system. In one embodiment, the method includes comparing the count, as qualified by the individual performance capability, divided by an unqualified count of members of the array, wherein the predetermined threshold comprises a predetermined percentage between 30% and 70% inclusive. In a further embodiment, the predetermined percentage may be between 45% and 70% inclusive.

The method also may include issuing a memory configuration warning as the selected action to be taken. In a further embodiment, the method may include receiving a reconfiguration of the array in response to the memory configuration warning, and repeating the steps of determining, taking a count, and taking a selected action to ascertain whether the memory configuration warning was eliminated by the reconfiguration. The reconfiguration may comprise replacing a member of the array with a member having a different individual performance capability, and may also comprise moving a member from a subset of the array to another subset of the array.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
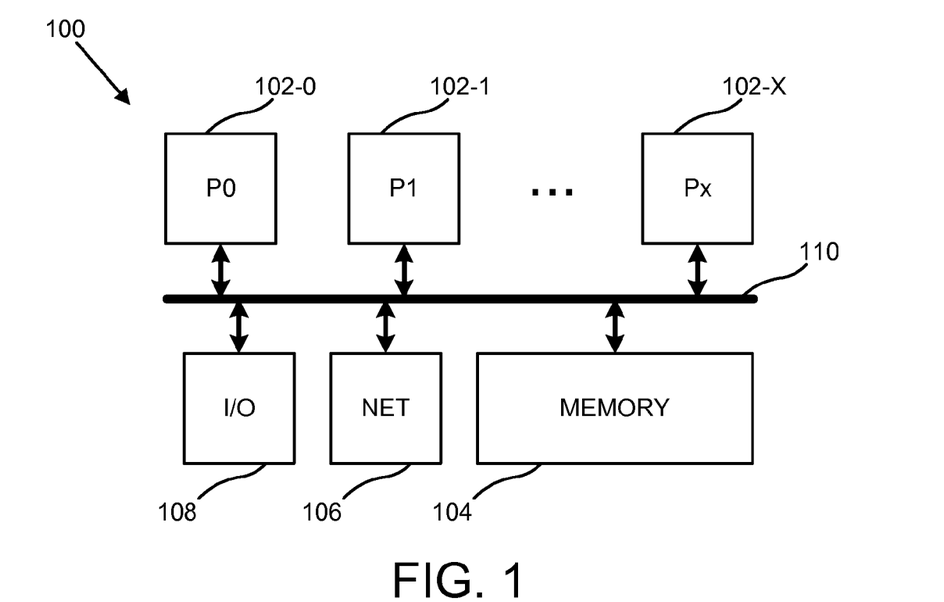
FIG. 1 is a schematic block diagram illustrating a possible computer hardware platform upon which the present invention may be at least in part deployed.

FIG. 1 illustrates a possible computer hardware platform 100 upon which the present invention may be at least in part deployed. The hardware platform 100 may include processor(s) 102, memory 104, a network interface 106, and an I/O (Input/Output) device interface 108, connected through a bus 110.

The hardware platform 100 may be of any form factor or type, including an embedded system, a handheld, a notebook, a personal computer, a minicomputer, a server, a mainframe, a supercomputer, and the like.

The processor(s) 102 may be present in any quantity, including a uniprocessor, and may have any instruction set architecture. In an embodiment, the processor(s) 102 may have one or more levels of dedicated or shared caches. Possible physical implementations may include multi-chip, single chip, multi-core, hyperthreaded processors, and the like.

The memory 104 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 106 may support any network protocol or architecture. It may support both wireless and hard-wired network connections. It may comprise Ethernet, Token Ring, System Network Architecture ("SNA"), and the like. In one embodiment, it may be integrated with the I/O device interface 108.

The I/O device interface 108 may be driven primarily by the processor(s) 102 or may incorporate an independent I/O processor subsystem. It may comprise Peripheral Component Interconnect ("PCI"), Small Computer System Interface ("SCSI"), Fiberchannel ("FC"), Enterprise System Connection ("ES CON"), ES CON over Fiberchannel ("FICON"), and the like. In an embodiment, it may include dedicated local I/O devices.

The bus 110 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 110 may comprise a high-speed internal network.

Figure 2:
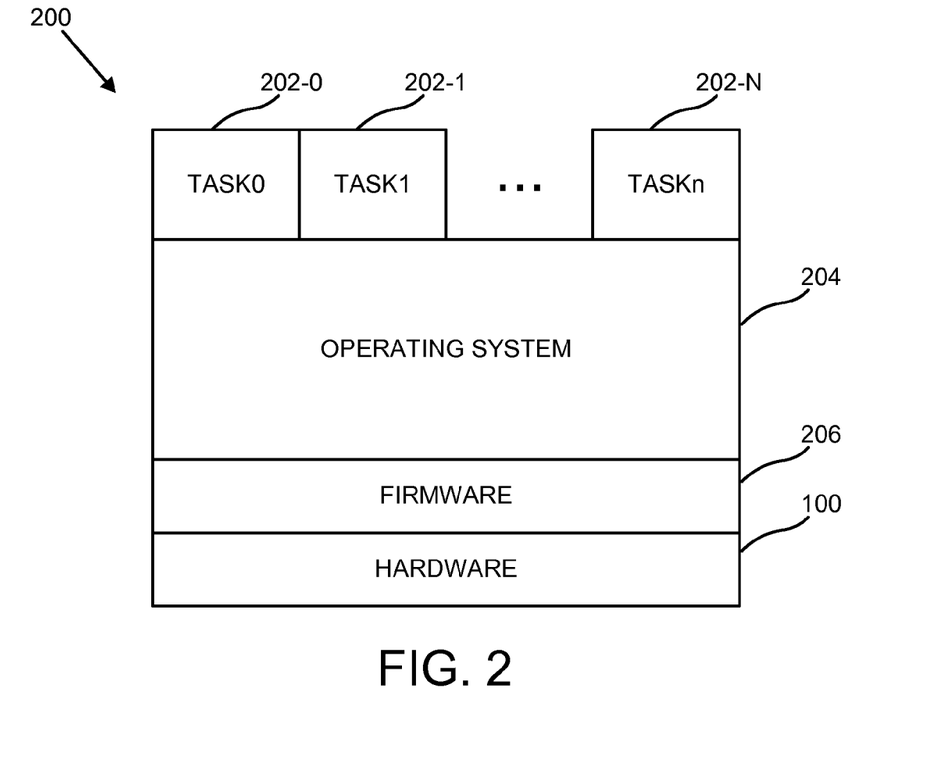
FIG. 2 is a schematic block diagram of a possible computer including a software stack in which the present invention may at least in part reside.

FIG. 2 is a diagram of a possible computer 200 including a software stack in which the present invention may at least in part reside. The software stack may include task(s) 202, hosted on an operating system 204, enabled by firmware 206, running on a hardware platform 100 of which the configuration of FIG. 1 is representative.

The task(s) 202 may include both user- and system-level tasks. They may be interactive or batch. They may run in the foreground or background. User-level task(s) 202 may include applications, programs, jobs, middleware, and the like. System-level task(s) 202 may include services, drivers, daemons, utilities, and the like.

The operating system 204 may be of any type and version and in any state. Types may include Unix, Linux, Windows, Mac, MVS, VMS, and the like. Versions may include Windows XP, Windows Vista, and the like. States may include a degree of customization, a mode of operation, a system preparation for setup, and the like. The operating system 204 may be single-user or multi-user. It may be single-tasking or multi-tasking. In an embodiment, the operating system 204 may be real-time. In another embodiment, the operating system 204 may be embedded.

The firmware 206 may comprise microcode, which may reside in a microstore of the processor(s) 102. In an embodiment, the firmware 206 may comprise low-level software, which may reside in memory 104. In one embodiment, the firmware 206 may comprise a rudimentary operating system 204. In a further embodiment, the firmware 206 may support virtualization so as to permit the concurrent operation of multiple operating systems 204 on a hardware platform 100.

Figure 3:
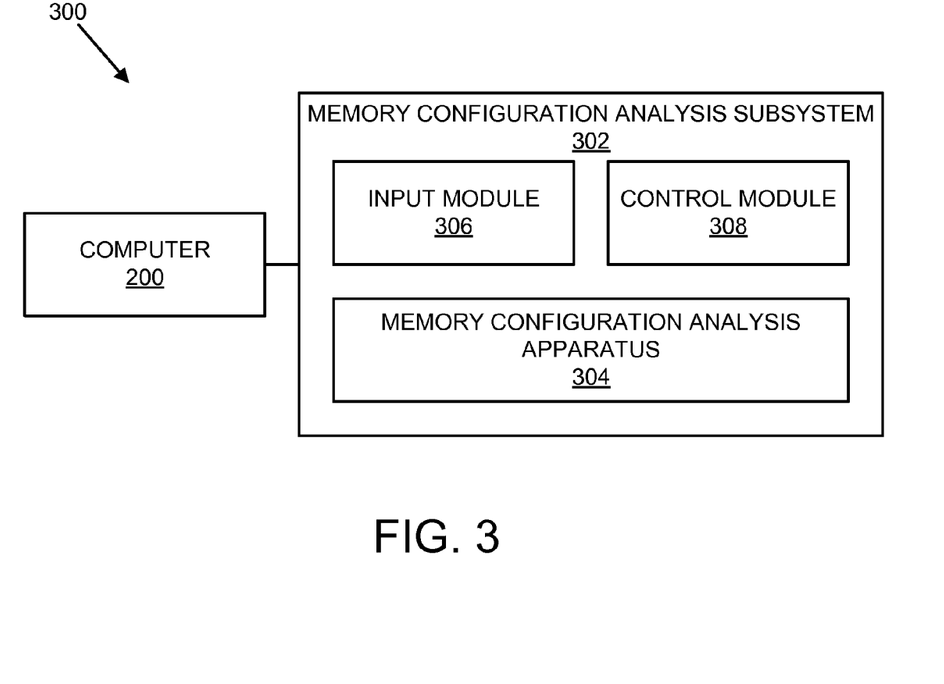
FIG. 3 is a schematic block diagram illustrating a system of the present invention.

FIG. 3 is a schematic block diagram illustrating a system 300 of the present invention, comprising the computer 200 and a memory configuration analysis subsystem 302. The subsystem 302 further comprises a memory configuration analysis apparatus 304, an input module 306, and a control module 308. In an embodiment, the foregoing components of the subsystem 302 may be fully or partially implemented within the hardware platform 100 or the software stack of the computer 200. The input module 306 may receive and convey to one or more other modules input such as configuration information regarding an array of memory devices comprised within the memory 104 of the hardware platform 100. The configuration information may be automatically detected, manually specified, or may comprise both automatic and manual forms of input. The apparatus 304 may be employed whenever memory configuration analysis is required in order to effect a given operation of the system 300, such as at initial power-on during power-on system test ("POST"), activated by the control module 308. Other operations requiring a memory configuration analysis may include reconfiguration of the memory 104, a change or upgrade of other related components within the hardware platform 100 such as the bus 110, system performance tuning, and the like.

Figure 4:
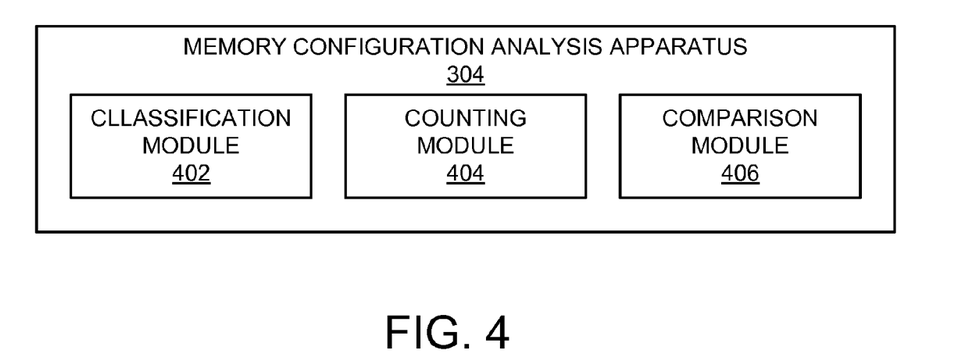
FIG. 4 is a schematic block diagram illustrating a memory configuration analysis apparatus according to the present invention.

FIG. 4 is a schematic block diagram illustrating the memory configuration analysis apparatus 304 according to the present invention, comprising a classification module 402, a counting module 404, and a comparison module 406. The classification module 402 determines overall performance of the array of memory devices. The counting module 404 takes a count of members of the array that have an individual performance capability that varies in a selected direction from the overall performance of the array.

In one embodiment, members having an individual performance capability greater than the overall performance of the array may be counted. In another embodiment, members having an individual performance capability less than the overall performance of the array may be counted. More generally, any combination of greater than, less than, and equal, or an inverse of any such combination, may be employed as the counting criterion. Equivalently, a count qualified by one of the foregoing combinations may be deducted from an unqualified count of members of the array to obtain a count of the inverse combination. In an embodiment, the unqualified count may be a total count of the array. In another embodiment, both the count and the unqualified count may comprise only a partial sampling of the members of the array.

The comparison module 406 takes a selected action if the count crosses a predetermined threshold in an increasing direction, or equivalently in a decreasing direction if an inverse counting criterion was used. In one embodiment, the predetermined threshold may be a fixed number. For example, the selected action may be warranted even if the individual performance capability of only one member varies from that of the overall performance. In another embodiment, the predetermined threshold may comprise a predetermined percentage of the unqualified count, expressed either as a percentage or as a number approximating that percentage of the unqualified count. The predetermined percentage may vary from 0% to 100%. A typical percentage would be 50%, plus or minus 20%, and preferably no less than 45%, or equivalently no greater than 55% if an inverse counting criterion was used. In one embodiment, the selected action may comprise issuing a memory configuration warning. In a further embodiment, the warning may comprise a severity related to the predetermined threshold.

Figure 5:
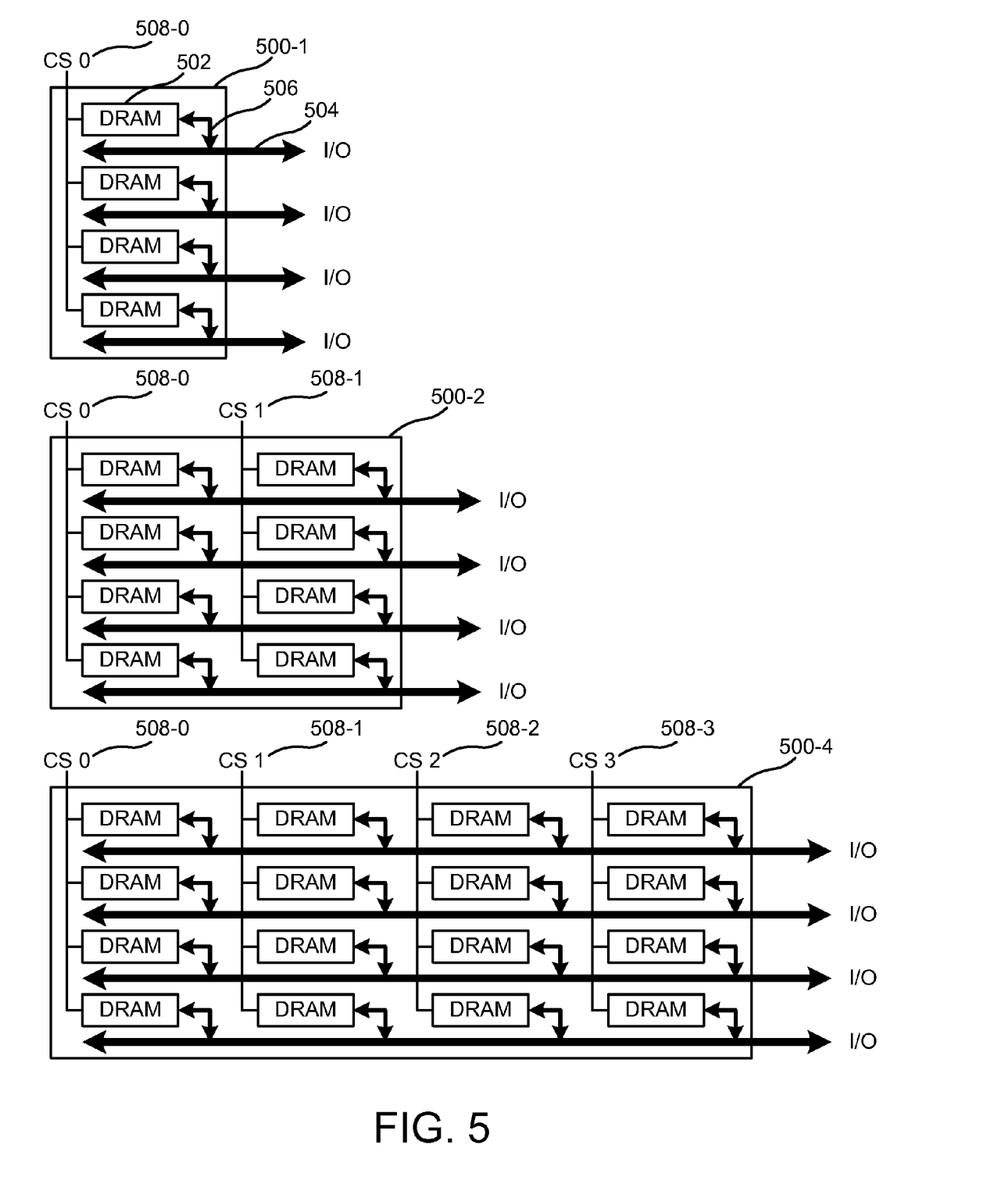
FIG. 5 is a schematic block diagram of memory device organization and structure.

FIG. 5 is a schematic block diagram of memory device organization and structure, including a single-rank memory device 500-1, a double-rank memory device 500-2, and a quad-rank memory device 500-4. The memory device 500 is comprised of one or more ranks of dynamic random-access memory chips ("DRAMs") 502. The DRAM 502 is connected to a bi-directional bus 504 via a tri-state connection 506. The tri-state connection 506 is enabled to drive the bi-directional bus 504 when a chip select 508 is asserted. A rank comprises all of the DRAMs controlled by a given chip select 508. First chip selects 508-0 control the first rank of their respective memory devices 500. Second chip selects 508-1 control the second rank of the double-rank memory device 500-2 and the quad-rank memory device 500-4. Third and fourth chip selects 508-2 and 508-3 control the third and fourth ranks respectively of the quad-rank memory device 500-4. In the embodiment shown, each rank comprises four DRAMs connected respectively to each of four bi-directional busses 504 in each memory device 500. Other embodiments may comprise a greater or lesser number of DRAMs 502 per rank.

Figure 6:
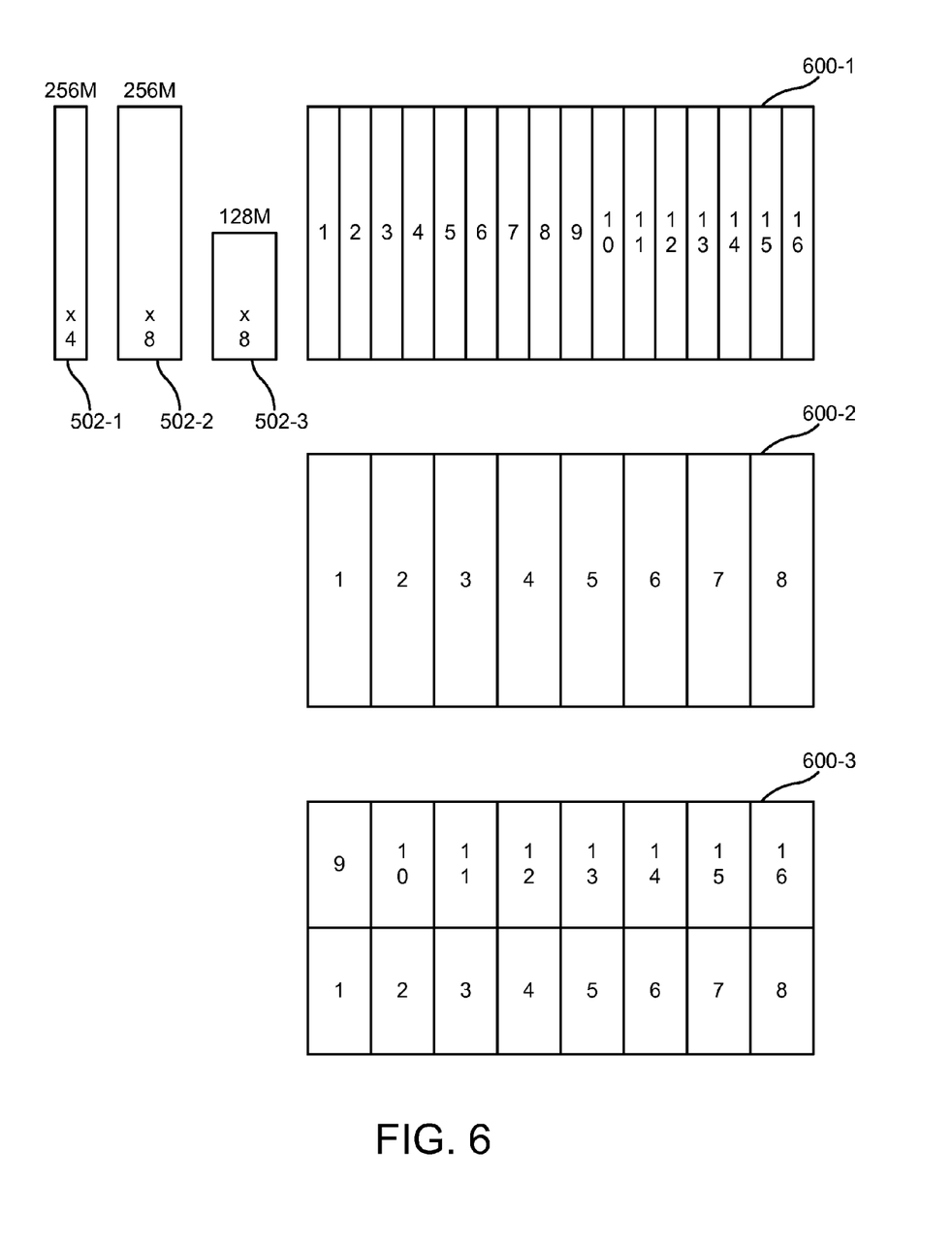
FIG. 6 is a schematic block diagram of dual in-line memory module ("DIMM") organization and structure.

FIG. 6 is a schematic block diagram of dual in-line memory module ("DIMM") 600 organization and structure. DIMMs 600-1 and 600-2 are single-rank memory devices 500-1, and DIMM 600-3 is a double-rank memory device 500-2. All of the DIMMs 600 shown have a capacity of 2 gigabytes (GB) with a total depth of $256 \times 2^{20}$ (M) and a total bus width of 64 bits. DIMM 600-1 is comprised of 16 DRAMs 502-1, each of which is 256M deep and 4 bits wide. DIMM 600-2 is comprised of 8 DRAMs 502-2, each of which is 256M deep and 8 bits wide. DIMM 600-3 is comprised of 16 DRAMs 502-3, each of which is 128M deep and 8 bits wide. Other embodiments differing by rank, depth, width, and capacity are also possible.

DIMMs 600 may also vary as to speed in megahertz (MHz) and type. The DIMMs 600 as shown are unbuffered (type U). DIMMs 600 may also be fully buffered (type FB), registered (type R), and so forth. Some or all of the foregoing characteristics may affect the individual performance capability of a DIMM 600. For example, a first DIMM 600 having a speed of 1066 MHz and a width of 64 bits would have higher bandwidth than a second DIMM 600 having a speed of 1333 MHz and a width of 32 bits, even though the speed of the first is lower than that of the second. As another example, higher rank may also affect individual performance capability, possibly due to increased loading on the bi-directional bus 504 from the higher number of tri-state connections 506. Thus a quad-rank memory device 500-4 may only support a speed of 800 MHz even though its constituent DRAMs 502 might have otherwise supported a higher speed in a lower-rank configuration.

Figure 7:
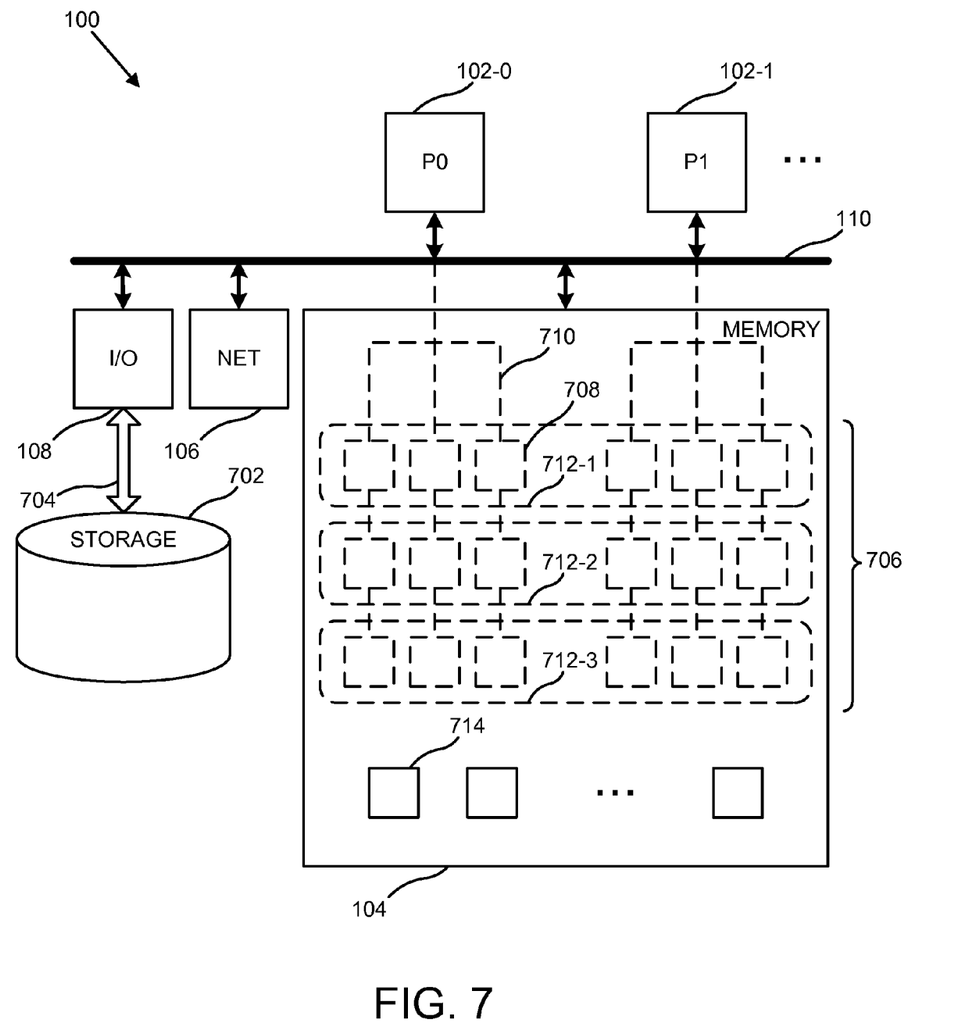
FIG. 7 is a more detailed schematic block diagram of the computer hardware platform.

FIG. 7 is a more detailed schematic block diagram of the computer hardware platform 100, further comprising a storage subsystem 702 connected via a storage interface 704 to the input/output device interface 108. The memory 104 comprises an array 706 of slots 708 to accommodate the memory devices 500. The slots 708 may be organized into subsets in which the slots 708 share the same channel 710. In the example shown, there are three channels 710 associated with each processor 102. The slots 708 are also grouped in tiers 712. In populating the slots 708 of a given channel 710 with memory devices 500, the slot 708 of the first tier 712-1 must be populated first, followed by the second tier 712-2, and then the third tier 712-3. There may also be other memory devices 714 which are not part of the array 706. Examples of other such memory devices include read-only memory ("ROM"), flash memory, complementary metal-oxide-semiconductor memory ("CMOS"), and the like.

In an embodiment, as the quantity of memory devices 500 populating the slots 708 of a given channel 710 increases, the overall performance of the array 706 may decrease, due to an increased load on the channel 710 or other design issues. The overall performance may also be limited by the individual performance capability of the lowest-performing device 500 in the array 706. As a result, the overall performance may have a substantially inverse relationship with the highest quantity of memory devices 500 populating a channel 710 of the array 706 and a substantially direct relationship with the lowest individual performance capability of the memory devices 500 themselves. These competing factors create a trade-off between the overall performance and the overall capacity of the array 706.

Performance, whether the overall performance of the array 706, or the individual performance capability of the memory device 500, may comprise one or more criteria such as frequency, bandwidth, access time, latency, and the like. In one embodiment, a single metric such as frequency expressed in MHz may suffice to characterize performance, everything else being equal. However, in another embodiment, the bandwidth might also vary if a configuration change in the array 706 involves a corresponding change in the width of the bus 110. In yet another embodiment, the latency may increase due to memory devices 500 populating increasingly remote slots 708 of the array 706, while the frequency may be kept constant by employing a pipelining approach.

As a useful abstraction to suppress the interrelated complexity of these various performance criteria, we shall hereinafter refer to a "performance class" as being representative of those processors 102, those configurations of the array 706 and those individual performance capabilities of the memory devices 500 that would support comparable overall performance. For example, performance class one may comprise processors 102 and memory devices 500 having a speed of 1333 MHz or an array 706 having only the first tier 712-1 populated, performance class two may comprise processors 102 and memory devices 500 having a speed of 1066 MHz or an array 706 having both the first tier 712-1 and the second tier 712-2 populated, and performance class three may comprise processors 102 and memory devices 500 having a speed of 800 MHz or an array 706 having all three tiers 712 are populated. It will be apparent to one of skill in the art that classification into performance classes could be based upon other performance criteria as well, which other criteria therefore fall within the scope of the present invention.

Figure 8:
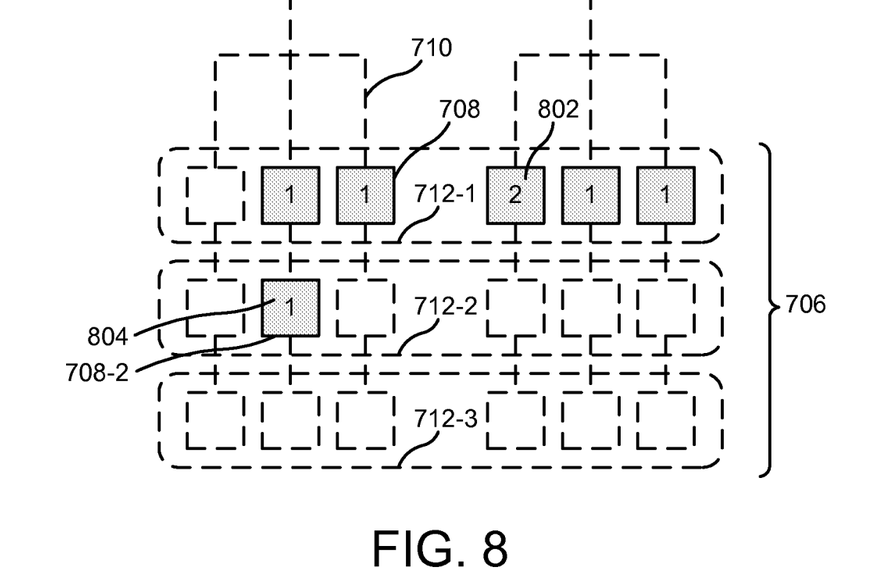
FIG. 8 is a schematic block diagram illustrating an example of a suboptimally configured memory array.

FIG. 8 is a schematic block diagram illustrating an example of a suboptimally configured memory array 706. A counting criterion of greater than is assumed, which is equivalent to less than in terms of the performance class number, and a nominal threshold percentage of 50% is assumed. The overall performance of the array 706 is of performance class is two, because the inherent performance capability of memory device 802 is of performance class two, and the second tier 712-2 is populated by a memory device 804. The qualified count is five, because five of the memory devices 500 are of performance class one, which is less than the performance class two of the array 706. The unqualified count is six, being the total number of memory devices 500 in the array 706. The threshold is three, being 50% of six. Thus the qualified count is greater than the threshold, causing the memory configuration warning to be issued.

Figure 9:
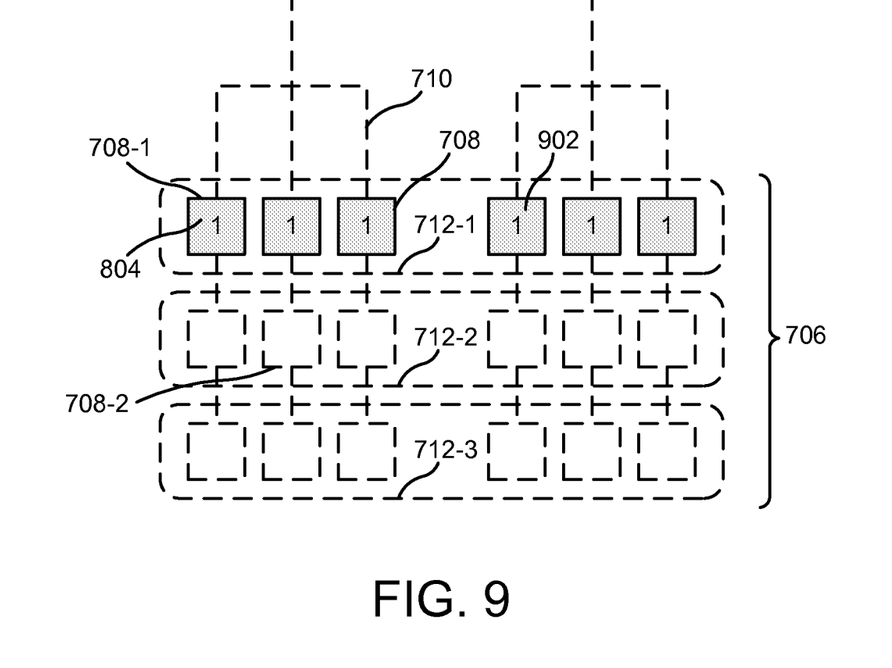
FIG. 9 is a schematic block diagram of an optimized reconfiguration of the suboptimally configured memory array.

FIG. 9 is a schematic block diagram of an optimized reconfiguration of the suboptimally configured memory array 706. First, the memory device 802 of performance class two has been replaced with a memory device 902 of performance class one. Secondly, the memory device 804 has been moved from slot 708-2 of the second tier 712-2 to slot 708-1 of the first tier 712-1. As a result, the overall performance of the array 706 is now of performance class one. The qualified count is now zero, because none of the memory devices 500 are of a performance class less than that of the array 706. Thus, the qualified count is less than the threshold, causing the memory configuration warning to no longer be issued.

Figure 10:
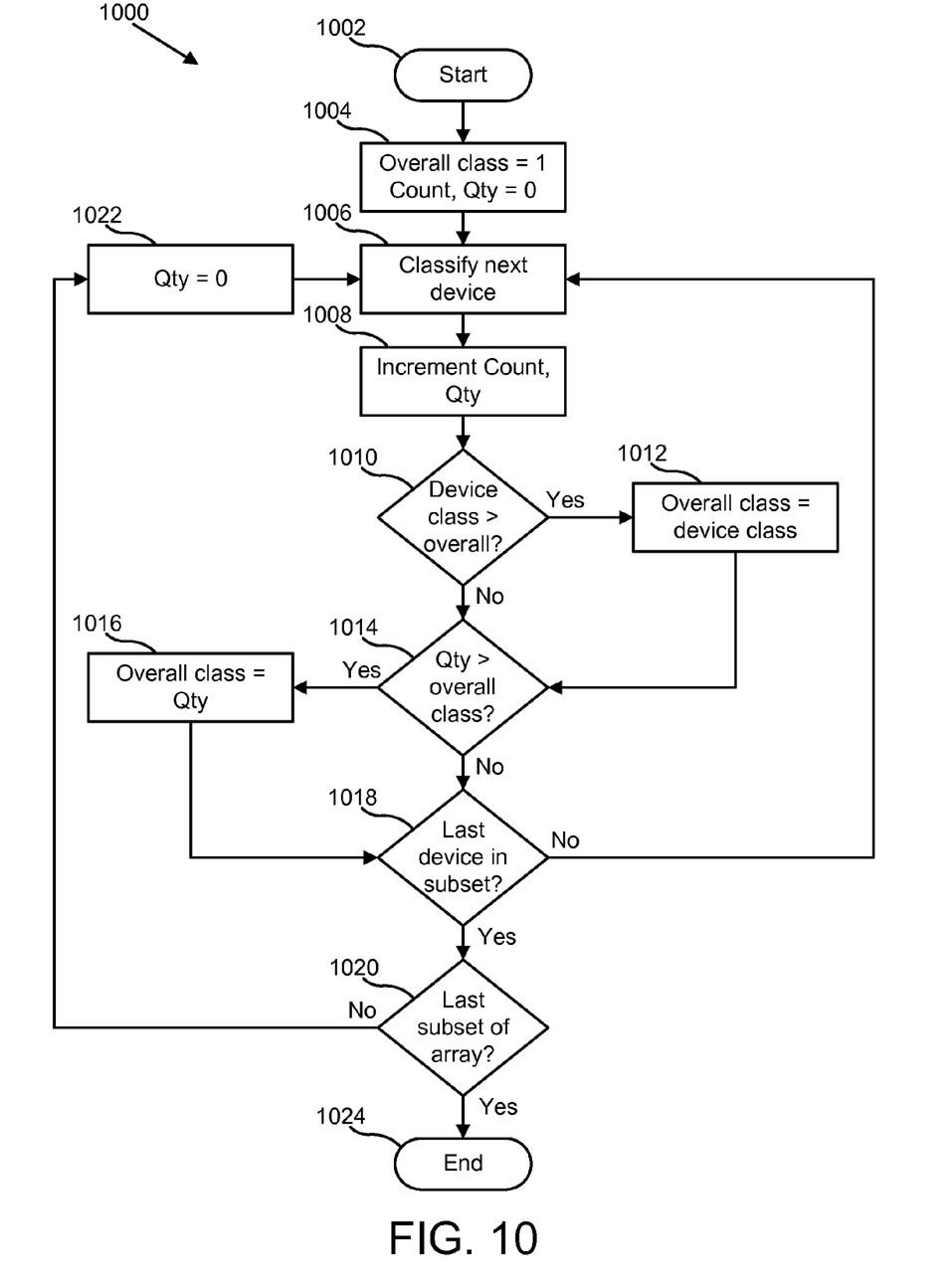
FIG. 10 is a schematic flow chart diagram illustrating one embodiment of a method for determining overall performance of a memory array as may be performed by a classification module in accordance with the present invention.

FIG. 10 is a schematic flow chart diagram illustrating one embodiment of a method for determining overall performance of a memory array 706 as may be performed by a classification module 402 in accordance with the present invention. The method 1000 starts 1002 and the overall performance class of the array 706, the unqualified count, and the quantity of memory devices 500 populating a subset or channel 710 are initialized 1004 to one, zero, and zero, respectively. The memory devices 500 are then examined in turn, classifying 1006 the individual performance capability of the next memory device, and the unqualified count and the quantity are both incremented 1008. If the memory device performance class representing the individual performance capability of the memory device 500 is greater than 1010 the overall performance class, then the overall performance class is set equal 1012 to the memory device performance class. If the quantity is greater than 1014 the overall performance class, then the overall performance class is set equal 1016 to the quantity. If the memory device 500 is not the last 1018 device in the subset, then the next memory device 500 is classified 1006 and the ensuing steps are repeated. If the subset is not the last 1020 subset in the array 706, then the next subset is examined in turn, reinitializing 1022 the quantity to zero, classifying 1006 the next memory device 500, and repeating the ensuing steps as before. After the last 1020 subset has been examined, the overall performance class has now been determined as the maximum of the memory device performance class of any individual memory device 500 and the quantity of memory devices 500 in any subset, the unqualified count has been determined as the total count of memory devices 500 comprising the array 706, and the method 1000 ends 1024.

Figure 11:
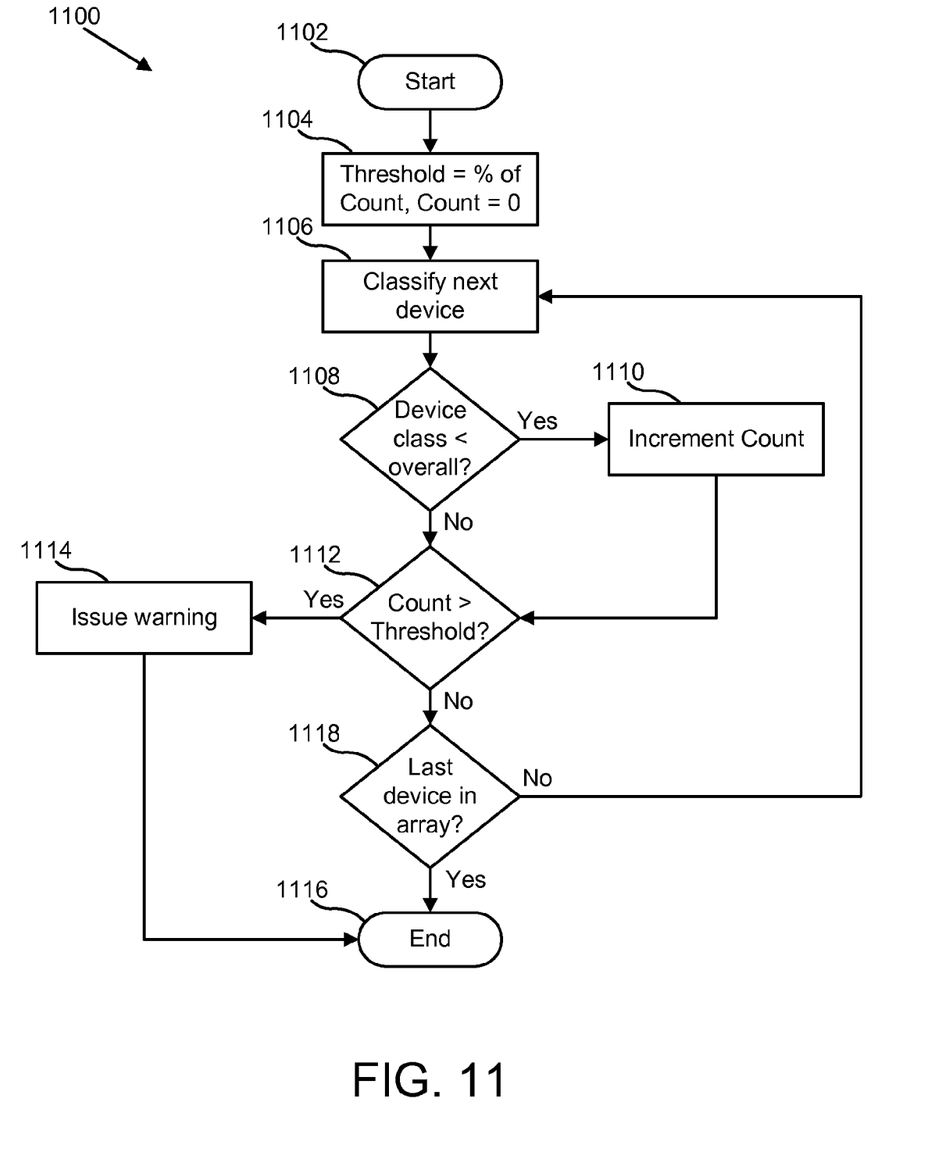
FIG. 11 is a schematic flow chart diagram illustrating one embodiment of a method for memory configuration analysis as may be performed by a counting module and a comparison module in accordance with the present invention.

FIG. 11 is a schematic flow chart diagram illustrating one embodiment of a method for memory configuration analysis as may be performed by a counting module 404 and a comparison module 406 in accordance with the present invention. The method 1100 starts 1102 and the predetermined threshold and the qualified count are initialized 1104 to a predetermined percentage of the unqualified count, as determined by the method 1000, and to zero, respectively. The memory devices 500 are then examined in turn, classifying 1106 the individual performance capability of the next memory device. If the memory device performance class representing the individual performance capability of the memory device 500 is less than 1108 the overall performance class, as determined by the method 1000, then the qualified count is incremented 1110. If the qualified count is greater than 1112 the predetermined threshold, then a selected action is taken such as issuing 1114 a memory configuration warning, and the method 1100 ends 1116. If the memory device 500 is not the last 1118 device in the array 706, then the next memory device 500 is classified 1106 and the ensuing steps are repeated. Otherwise, no selected action is taken and the method 1100 ends 1120.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a classification module that determines an overall performance of an array of members that are memory devices in a computer memory, the array being reconfigurable by replacing a member of the array and by moving a member within the array;
   a counting module that takes a count of members of the array that have an individual performance capability that varies in a selected direction from the overall performance of the array; and
   a comparison module that issues a memory configuration warning advising a reconfiguration of the array if the count crosses a predetermined threshold,
   wherein the classification module, the counting module, and the comparison module comprise one or more of logic hardware and executable code, the executable code stored on one or more computer-readable storage devices.

2. The apparatus of claim 1, wherein the predetermined threshold comprises a predetermined percentage, between 30% and 70% inclusive, for comparison with the count, as qualified by the individual performance capability, divided by an unqualified count of members of the array.

3. The apparatus of claim 1, wherein the overall performance has a substantially inverse relationship with a highest quantity of members of a subset of the array and a substantially direct relationship with the individual performance capability of the members.

4. The apparatus of claim 1, wherein performance is determined on the basis of one or more of frequency, bandwidth, access time, and latency.

5. The apparatus of claim 1, wherein the overall performance and the individual performance capability belong to one of a plurality of performance classes.

6. A system comprising:
- a computer having one or more processors and having a computer memory comprising an array of members that are memory devices, the array being reconfigurable by replacing a member of the array and by moving a member within the array;
- a classification module that determines overall performance of the array;
- a counting module that takes a count of members of the array that have an individual performance capability that varies in a selected direction from the overall performance of the array;
- a comparison module that issues a memory configuration warning advising a reconfiguration of the array if the count crosses a predetermined threshold; and
- a control module that activates the classification module, the counting module, and the comparison module to analyze the configuration of the array,
- wherein the classification module, the counting module, the comparison module, and the control module comprise one or more of logic hardware and executable code, the executable code executable on the processor and stored in one or more of the array of memory devices and another memory device in the computer memory.

7. The system of claim 6, wherein the predetermined threshold comprises a predetermined percentage, between 30% and 70% inclusive, for comparison with the count, as qualified by the individual performance capability, divided by an unqualified count of members of the array.

8. The system of claim 6, wherein the overall performance has a substantially inverse relationship with a highest quantity of members of a subset of the array and a substantially direct relationship with the individual performance capability of the members.

9. The system of claim 8, wherein one or more of the subsets of the array are associated with each of the one or more processors.

10. The system of claim 6, wherein the individual performance capability of the memory device is determined on the basis of one or more of rank, capacity, speed, type, and depth.

11. The system of claim 6, wherein the memory device comprises a dual in-line memory module ("DIMM") and the subset comprises a channel.

12. The system of claim 6, wherein the overall performance and the individual performance capability belong to one of a plurality of performance classes.

13. A computer program product comprising one or more non-transitory computer-readable storage devices having computer usable program code executable to perform operations, the operations of the computer program product comprising:
- determining an overall performance of an array of members that are memory devices in a computer memory, the array being reconfigurable by replacing a member of the array and by moving a member within the array;
- taking a count of members of the array that have an individual performance capability that varies in a selected direction from the overall performance of the array; and
- issuing a memory configuration warning advising a reconfiguration of the array if the count crosses a predetermined threshold.

14. The computer program product of claim 13, wherein the predetermined threshold comprises a predetermined percentage, between 30% and 70% inclusive, for comparison with the count, as qualified by the individual performance capability, divided by an unqualified count of members of the array.

15. The computer program product of claim 13, wherein the overall performance has a substantially inverse relationship with a highest quantity of members of a subset of the array and a substantially direct relationship with the individual performance capability of the members.

16. The computer program product of claim 13, further comprising the operations of:
- receiving a reconfiguration of the array in response to the memory configuration warning; and
- repeating the operations of determining, taking a count, and issuing a memory configuration warning to ascertain whether the memory configuration warning was eliminated by the reconfiguration.

17. The computer program product of claim 13, wherein the overall performance and the individual performance capability belong to one of a plurality of performance classes.

18. A data-processing machine-implemented method comprising the steps of:
- determining an overall performance of an array of members that are memory devices in a computer memory, the array being reconfigurable by replacing a member of the array and by moving a member within the array;
- taking a count of members of the array that have an individual performance capability that varies in a selected direction from the overall performance of the array; and
- issuing a memory configuration warning advising a reconfiguration of the array if the count crosses a predetermined threshold.

19. The method of claim 18, wherein the predetermined threshold comprises a predetermined percentage, between 30% and 70% inclusive, for comparison with the count, as qualified by the individual performance capability, divided by an unqualified count of members of the array.

20. The method of claim 19, wherein the predetermined percentage is between 45% and 70% inclusive.

21. The method of claim 18, wherein the overall performance has a substantially inverse relationship with a highest quantity of members of a subset of the array and a substantially direct relationship with the individual performance capability of the members.

22. The method of claim 21, further comprising the steps of:
- receiving a reconfiguration of the array in response to the memory configuration warning; and
- repeating the steps of determining, taking a count, and issuing a memory configuration warning to ascertain whether the memory configuration warning was eliminated by the reconfiguration.

23. The method of claim 22, wherein the reconfiguration comprises replacing a member of the array with a member having a different individual performance capability.

24. The method of claim 22, wherein the reconfiguration comprises moving a member from a subset of the array to another subset of the array.

25. The method of claim 18, wherein the overall performance and the individual performance capability belong to one of a plurality of performance classes.

* * * * *